United States Patent Office.

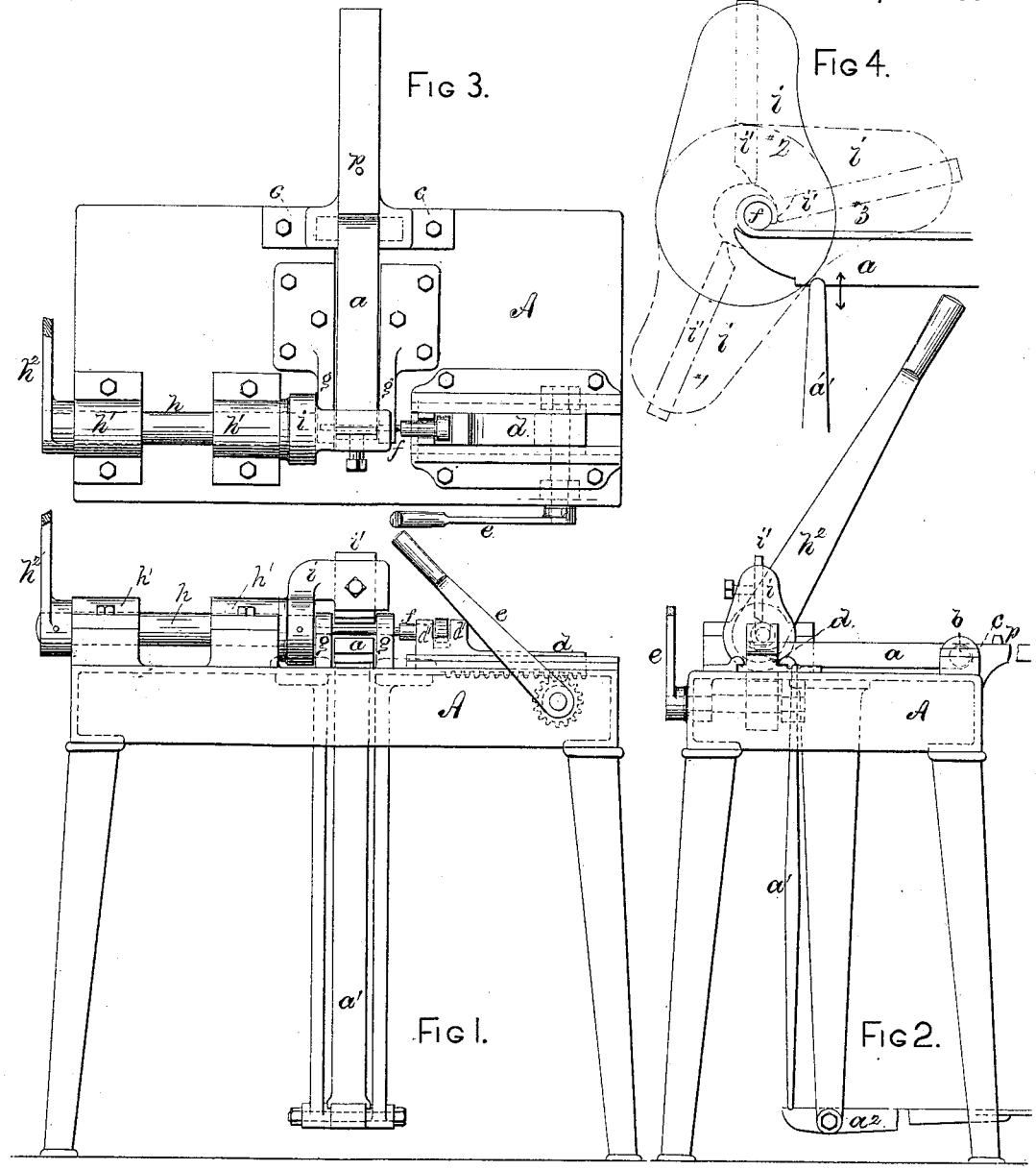

WILLIAM A. SWEET, OF SYRACUSE, NEW YORK.

TURNING THE ENDS OF SPRINGS.

SPECIFICATION forming part of Letters Patent No. 320,187, dated June 16, 1885.

Application filed June 12, 1884. (No model.)

*To all whom it may concern:*

Be it known that I, WILLIAM A. SWEET, of Syracuse, Onondaga county, State of New York, have invented a new and useful Machine for Rolling the Ends of Springs for Vehicles, of which the following is a specification.

My invention is made to facilitate properly and expeditiously turning the ends of springs for vehicles with accuracy and precision. I attain these objects by the mechanism illustrated in the accompanying drawings, in which—

Figure 1 is a front elevation; Fig. 2, a side elevation; Fig. 3, a plan; Fig. 4, an enlarged detail.

The same letters of reference are used in all the figures to designate like parts.

On a suitable frame and bed, A, made to support the working parts, there is an oblong plate or lifter, $a$, pivoted on trunnions at $b$, that turn in bearings $c$, affixed to the bed A of the frame. This lifter $a$ is level on its upper surface, except at its forward end, which is chamfered off and slightly curved upward, and it is broad enough for the broadest spring to be turned on it. (Clearly seen in Fig. 4.) Near the front end of this lifter it rests on a vertical bar, $a'$, the lower end of which bears on the end of a foot lever or treadle, $a^2$, (see Fig. 2,) by which the lifter $a$ is raised to bring the spring to be turned up to the pin $f$.

At right angles to the lifter, near the front end, slideways are affixed to the bed, in which a carriage or pin-drawer slides, moved by a pinion gearing into a rack on its under side, which is turned by a lever, $e$, (see Fig. 1,) by which the pin $f$ is moved through the two holders $g$ $g$ over the end of the lifter, and drawn back to release it from the curved end of the spring after it has been bent around it, as in Fig. 4. To connect the pin $f$ with the pin-drawer $d$, it is made to rest in a recess formed by the projections $d'$, upon the inner end of $d$, the head of the pin fitting in between the projections, and its shank resting in a recess in the inner one, Figs. 1, 2. By this means the pin is readily withdrawn to cool it and replaced without disturbing any other part. When it is thrust forward by the pin-driver, it projects through the two holders $g$ $g$, affixed to the bed on each side of the lifter, and after the end of the spring has been turned around it it is drawn out by turning the lever $e$.

Opposite the pin $f$, and parallel with it, is a shaft, $h$, resting in journal-bearings $h'$, affixed to the bed. This shaft is set eccentric to the axis of pin $f$. (See Fig. 4.) It bears upon its inner end a stout radial arm, $i$, turned over the pin $f$ at its outer end, in which a tool I denominate a "wiper," $i'$, is set. On the opposite end of shaft $h$ there is a radial handle, $h^2$, by which it is turned.

When this machine is to be used, the lifter $a$ is depressed and the wiper turned down into position 1. (See Fig. 4.) The pin $f$ is thrust forward above the lifter, ready to receive the heated end of the spring, which is put in upon the lifter, its end projecting over the lifter, above the wiper, and under the pin $f$. By bearing upon the treadle $a^2$ the spring is borne by the lifter up against the pin and firmly held, while the wiper is forced around into positions 2 and 3, gradually approaching the pin $f$ in its circuit, and bending the heated end of the spring close around the pin, Fig. 4. By means of the lever-handle $h^2$ the wiper is then thrown back, the lifter falls, and the pin $f$ is withdrawn, leaving the machine ready for a repetition of the operation.

Having thus described my machine, I claim—

1. In combination with the pin $f$, the lifter $a$, having its front end curved upward, as set forth, constructed, arranged, and operated substantially as and for the purposes described.

2. The wiper $i'$, placed and supported eccentric to the sliding pin $f$, as and for the purposes specified.

3. The shaft $h$ and wiper-arm $i$, placed eccentric to pin $f$, as and for the purposes specified.

4. The combination of the lifter $a$, having its end turned upward, and the eccentric wiper $i'$, and pin $f$, for turning the ends of vehicle-springs, substantially as herein described.

W. A. SWEET.

Witnesses:
MATTHEW CUNNINGHAM,
HENRY BABCOCK.